F. E. BAGER.
TRACTION DEVICE.
APPLICATION FILED MAY 25, 1914.
1,238,079.
Patented Aug. 28, 1917.
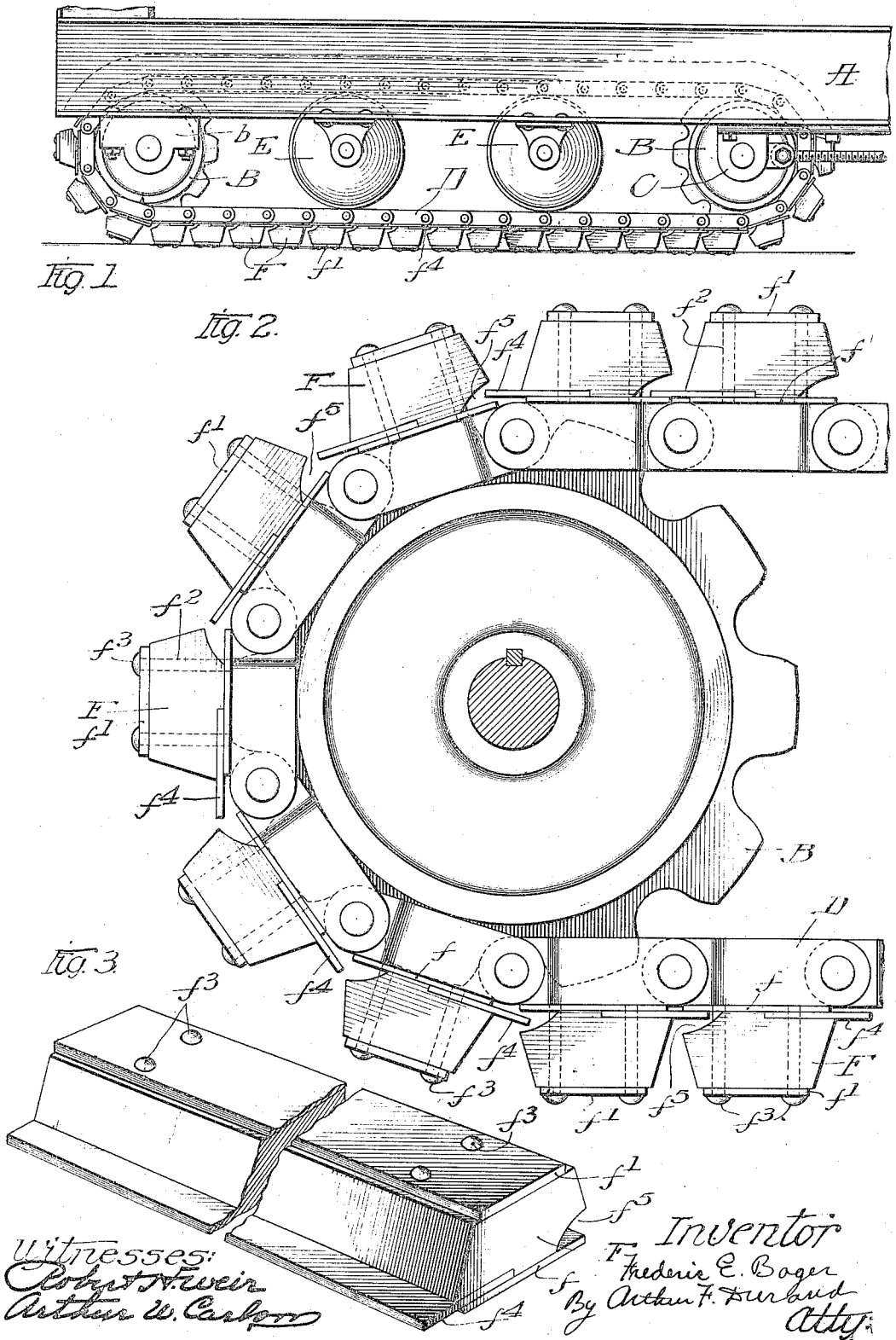

UNITED STATES PATENT OFFICE.

FREDERIC E. BAGER, OF WINTHROP HARBOR, ILLINOIS, ASSIGNOR TO FREDERICK C. AUSTIN, OF CHICAGO, ILLINOIS.

TRACTION DEVICE.

1,238,079.          Specification of Letters Patent.      Patented Aug. 28, 1917.

Application filed May 25, 1914. Serial No. 840,688.

*To all whom it may concern:*

Be it known that I, FREDERIC E. BAGER, a citizen of the United States of America, and resident of Winthrop Harbor, Lake county, Illinois, have invented a certain new and useful Improvement in Traction Devices, of which the following is a specification.

My invention relates to traction devices of the kind ordinarily known as "caterpillars." A device of this kind ordinarily comprises an endless belt which travels flatwise on the ground, and which forms a support for the wheels of the machine, such as a traction engine, excavating machine, or other heavy bodied machine, whereby the said traction engine or excavator may travel upon soft ground without difficulty, the so-called "caterpillars" forming a broad platform upon which the wheels of the machine are enabled to travel without sinking into the ground.

The object of my invention is to provide a traction device or so-called "caterpillar" of this general character, but having provisions whereby mud and soft dirt cannot crowd upward between the slats or transverse ridges on the face of the belt, thus preventing the dirt and mud from accumulating on the inner surface of the belt, and making it possible for the supporting wheels of the traction engine, excavator, or other heavy machine to travel upon the belt or so-called "caterpillar" without becoming clogged with mud and dirt, and whereby the entire device is more easily kept clean inside and rendered more certain in its operation, as will hereinafter more fully appear.

To these and other useful ends, my invention consists in matters hereinafter described and claimed.

In the accompanying drawings:—

Figure 1 is a side elevation of a traction device or so-called "caterpillar" embodying the principles of my invention.

Fig. 2 is an enlarged elevation of the forward end of said device, showing the overlapping construction of the cross slats which provide transverse ridges for the face of the belt, and whereby the requisite traction is insured.

Fig. 3 is a perspective of one of the cross slats of the said traction device or "caterpillar," with the central portion thereof broken away for the convenience of illustration, it being understood that these slats or long traction teeth can be of any suitable length, depending upon the area required for the proper support of the wheels.

As thus illustrated, the frame A may be that of a traction engine, excavator or other heavy bodied machine. The sprocket wheels B are suitably supported in bearings $b$ on the under side of said frame, and the similar sprocket wheels C are supported in adjustable bearings $c$ suitably secured to said frame. The sprocket chains or belts D travel around said sprocket wheels, and the weight of the body frame is supported by the wheels E which roll upon the inner surface of the broad belt formed by the sprocket chains and their slats F, which latter are arranged close together, and extend transversely of the said belt. Referring to Figs. 2 and 3, it will be seen that each said slat comprises a base plate $f$ which is secured to the links of the sprocket chains, an outer or tread plate $f^1$, and an intermediate bar or filler $f^2$, the three elements being clamped tight together and secured to the sprocket chains by bolts $f^3$ of any suitable character. The spaces between the base plates $f$ are covered by the overlapping plates or battens $f^4$, each of these plates being secured to one of the plates $f$ in any suitable manner, as for example, by the clamping pressure of the filler $f^2$ and the fastening bolts. Each bar or filler $f^2$ is provided at one lower edge thereof with a recess $f^5$ for the projecting edge portion of the adjacent plate $f^4$, it being observed that this recess is of a size and shape to permit relative movement between the said plate $f^4$, and the base plate $f$ to which said filler is secured. In other words, and with this construction and relative formation of the slats, the articulation of the sprocket chains is not interfered with in any way, notwithstanding the fact that when the chains are horizontal and traveling on the ground the spaces between the slats are tightly closed by the said overlapping plates or battens $f^4$, whereby mud and loose dirt cannot rise through the sprocket chains and cross slats. It will also be seen that the bars or fillers $f^2$, which are preferably of wood, or other fibrous material, are beveled at their opposite sides, whereby they have the shape of long teeth or transverse ridges and are adapted to sink into the ground to insure the requisite traction. The plates $f$, $f^1$ and $f^4$ are preferably of metal, whereby each slat has a metallic base and also a metallic tread; but in each case the body portion of the slat is of wood or fibrous material.

In a traction device or "caterpillar" of this character, it is important, of course, that the tread or contacting surface thereof be of a character to insure not only sufficient traction, but also sufficient supporting area—that is to say, the flexible traveling platform or "caterpillar" belt must provide a sufficient area to prevent the machine from sinking into soft ground. It is also important, of course, that elements of the belt be perfectly free from crevices or recesses into which stones or hard substances could be forced and held, as in such case the flexibility or articulation of the belt might be seriously interfered with during the traveling movement thereof. With my improved construction, however, it will be seen that a broad surface of any desired area can be provided, and that this flexible platform upon which the wheels travel is practically tight and free from openings at all times while in contact with the ground. Thus, mud and dirt and gravel cannot rise through the belt, and cannot accumulate upon the inner surface thereof; and in addition, this is accomplished without in any way interfering with the flexibility of the belt while traveling around the sprocket wheels, and without affording any opportunity for the wedging or stones and hard substances between the elements of the belt, whereby danger of breakage in this way is practically precluded. The steel plates or batten tightly and effectively close the openings between the slats of the belt, while the belt is resting flatwise on the ground, and thus nothing can pass upward through the belt, or between any elements thereof. At the same time, however, the formation of the slats enables them to sink into the ground, if this is necessary to obtain traction; but the outwardly flaring spaces between the slats prevents the retention of anything between them. When the belt travels around the sprocket wheels, the relative movement between the slats, and the outward thrust of the batten plates tends to break up and dislodge any dirt or mud which may have accumulated between the slats, but at no time, for the reasons explained, can mud or dirt force its way upward between the slats while they are in contact with the ground, and this is the principal object and chief advantage of my invention.

I do not limit myself to the exact construction shown and described.

What I claim as my invention is:—

1. A traction-belt comprising a series of transverse slats rigidly secured upon the links of the belt and having flatwise overlapping portions for preventing mud and dirt from rising through the belt, and means outside of said portions for engaging the ground, forming the spaced treads of said slats, said belt having a pivot for each overlap thereof.

2. A traction-belt, as stated in claim 1, each slat having a base plate, and said means including a tread plate, a strip of fibrous material interposed between said plates, and bolts inserted through each slat to hold the parts thereof together.

3. A traction-belt comprising a series of transverse slats rigidly secured upon the links of the belt and having overlapping portions for preventing mud and dirt from rising through the belt, and means outside of said portions for engaging the ground, forming the spaced treads of said slats, said belt having a pivot for each over-lap thereof, and each slat having a recess to receive the overlapping edge-portion of the next slat, the said recess and overlapping portion of each slat being disposed at opposite sides thereof.

4. A traction-belt comprising a series of transverse slats rigidly secured upon the links of the belt and having overlapping portions for preventing mud and dirt from rising through the belt, and means outside of said portions for engaging the ground, forming the spaced treads of said slats, said belt having a pivot for each over-lap thereof, each slat having a base plate, and said means including a strip of fibrous material secured to said plate, each said strip of fibrous material having a recess to receive the overlapping edge-portion of the next slat, said recess extending along the edge of said plate.

5. A traction-belt comprising a series of transverse slats having overlapping portions for preventing mud and dirt from rising through the belt, means outside of said portions for engaging the ground, forming the spaced treads of said slats, and an endless member for connecting said slats, having flexibility to permit traveling motion thereof, each slat having a base plate, and said overlapping portions being formed by other plates disposed upon and overhanging the edges of said base plates, these other plates being held against displacement by said means.

Signed by me at Chicago, Illinois, this 9th day of May 1914.

FREDERIC E. BAGER.

Witnesses:
JOHN T. WILSON,
JAMES C. FRENCH.